(No Model.)

F. P. EASTMAN.
FEED BAG FOR ANIMALS.

No. 347,582. Patented Aug. 17, 1886.

WITNESSES:
John M. Deemer
C. Sedgwick

INVENTOR:
F. P. Eastman
BY Munn & Co.
ATTORNEYS.

United States Patent Office.

FRANKLIN P. EASTMAN, OF NEW YORK, N. Y.

FEED-BAG FOR ANIMALS.

SPECIFICATION forming part of Letters Patent No. 347,582, dated August 17, 1886.

Application filed February 27, 1886. Serial No. 193,477. (No model.)

*To all whom it may concern:*

Be it known that I, FRANKLIN P. EASTMAN, of the city, county, and State of New York, have invented a new and useful Improvement in Feed-Bags for Animals, of which the following is a specification, reference being had to the annexed drawings, forming a part thereof, in which—

Figure 1:
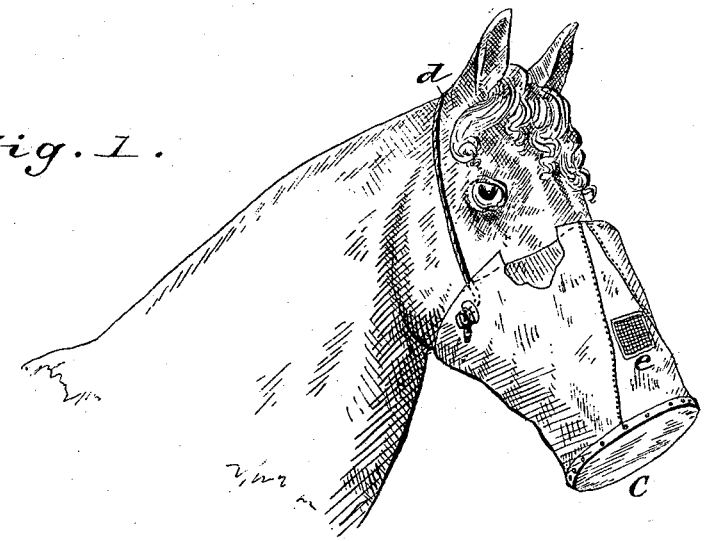
Figure 2:
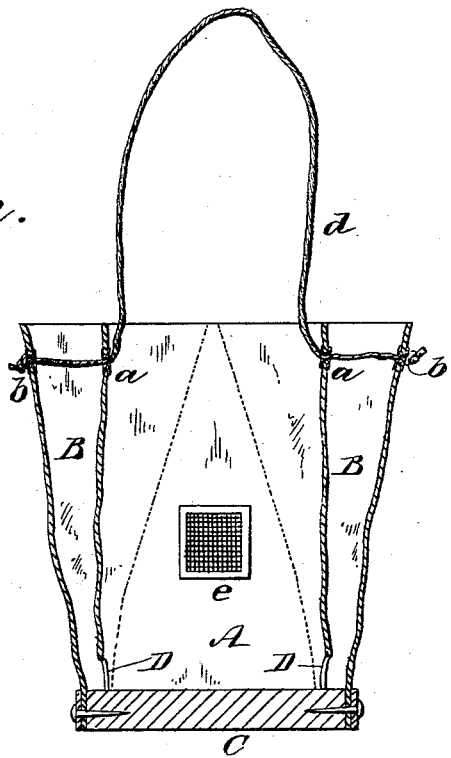

Figure 1 is a side elevation. Fig. 2 is a transverse section.

Similar letters of reference indicate corresponding parts in both figures of the drawings.

My invention is an improvement in the class of feed-bags for horses, &c., in which there is an outer compartment for holding and feeding the grain to a central or inner compartment that receives the animal's nose.

The construction and combination of parts are as hereinafter described.

In carrying out my invention I construct the feed-bag with a central compartment, A, and two side compartments, B, partly encircling the central compartment, and a wooden bottom, C, fitted to the lower part of the central compartment, and secured therein by nailing, or in any other suitable manner.

In the partition separating the central from the side compartments, near the bottom of the bag, are formed apertures D, through which the grain passes from the side compartments, B, to the lower part of the central compartment.

In the hem of the canvas forming the inner compartment I insert metallic eyelets $a$ on diametrically-opposite sides, and at a corresponding point on the hem of the canvas forming the walls of the outer compartment I form eyelets $b$, and through these eyelets I pass a rope or cord, $d$, and knot it at the ends outside of the outer walls of the feed-bag. Two objects are subserved by this arrangement of the cord; first, it tends to draw the mouths of compartments B together, so as to prevent the grain spilling out and being thus wasted, and, second, it affords a double hold for the cord, so that the weight of the filled bag is supported without danger of tearing the fabric.

As the central part of the feed-bag can never be more than partly full of grain, the animal will have as much breathing space as will be required; but for the purposes of cooling and ventilation I provide an opening, $e$, which may be covered with wire-gauze or perforated sheet metal, as shown in the drawings, or it may be left entirely open, as the grain can never reach a height which will allow it to escape through the opening $e$.

In making my improved feed-bag I first make a central compartment of a single strip of canvas stitched together at the ends, and then apply pieces of canvas of trapezoidal shape to the sides of the central compartment, to form the compartment B. The passages between the inner and outer compartments are formed by slitting the canvas of the inner compartment near the bottom thereof, turning it upward upon itself, and stitching it to form a substantial hem, or the opening may be made by cutting a semicircular notch in the canvas of the inner compartment; or a communication may be established between the inner and outer compartments by a series of holes of suitable size in the canvas separating the two compartments.

It should be observed that in this feed-bag, when suspended or in use, no covers are necessary to close the upper ends or mouths of the compartments B; but as the sides or bodies of both compartments A and B are constructed of canvas or similarly-flexible material, the compartments B become self-closing at their tops, and keep closed against waste of feed from them when the bag is suspended, and the compartments B then only can be opened by forcibly separating by hand the adjacent upper portions of the central compartment, A, and outer compartment or compartments, B. This is the natural effect when each outer compartment, as well as the inner one, are made of soft and flexible material at their sides, and when the suspending means is connected so as to draw in a closing manner upon the mouth of each outer compartment of the bag weighted with the feed; and the special arrangement and attachment of the cord $a$ herein shown and described is a very efficient one for the purpose, besides, by its support of both the inner and outer compartments, affording a double hold for the cord to support the weight of the filled bag without risk of tearing the fabric, as hereinbefore set forth.

When the bag is empty and not suspended, both the inner and outer compartments may be collapsed to facilitate storing away, &c.

Having thus described my invention, what I claim as new, and desire to secure by Letters Patent, is—

1. In a feed-bag for animals, composed of a central inner open-topped flexible compartment, A, and opposite side outer open-topped flexible compartments, B B, in communication at or near their base with the central compartment, the inner compartment, A, provided on opposite sides at or near its top with apertures adapted to receive freely through them the suspension-cord applied to carry or support both the inner and outer compartments, substantially as specified.

2. In a feed-bag for animals, composed of inner and outer compartments in communication with each other at or near their base, the combination, with the canvas feed-bag having double side walls, forming an inner open-topped compartment, A, and outer open-topped opposite flexible side pockets or compartments, B B, in communication with the central compartment at or near their base, of the suspension-cord d, connected with the exterior sides of the outer compartments at or near their tops, and fitted to slide freely through and to support the walls which separate the inner from the outer compartments, substantially as and for the purposes specified.

FRANKLIN P. EASTMAN.

Witnesses:
EDGAR TATE,
EDWD. M. CLARK.